(12) United States Patent
Desimone (10) Patent No.: US 11,151,247 B2
(45) Date of Patent: Oct. 19, 2021

(54) SYSTEM AND METHOD FOR DETECTING MALWARE INJECTED INTO MEMORY OF A COMPUTING DEVICE

(71) Applicant: Endgame, Inc., Arlington, VA (US)

(72) Inventor: Joseph W. Desimone, Hanover, MD (US)

(73) Assignee: Endgame, Inc., Arlington, VA (US)

( * ) Notice: Subject to any disclaimer, the term of this patent is extended or adjusted under 35 U.S.C. 154(b) by 0 days.

(21) Appl. No.: 15/648,972

(22) Filed: Jul. 13, 2017

(65) Prior Publication Data

US 2019/0018958 A1 Jan. 17, 2019

(51) Int. Cl.
*G06F 21/56* (2013.01)
*G06F 21/57* (2013.01)

(52) U.S. Cl.
CPC .......... *G06F 21/563* (2013.01); *G06F 21/566* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 5,481,684 A | 1/1996 | Richter et al. | |
| 7,085,928 B1* | 8/2006 | Schmid | G06F 21/51 713/164 |
| 7,640,589 B1 | 12/2009 | Mashevsky et al. | |
| 8,555,385 B1 | 10/2013 | Bhatkar et al. | |
| 8,555,386 B1 | 10/2013 | Belov | |
| 9,055,093 B2 | 6/2015 | Borders | |
| 9,292,689 B1 | 3/2016 | Chuo | |
| 9,356,944 B1 | 5/2016 | Aziz | |
| 9,407,648 B1 | 8/2016 | Pavlyushchik et al. | |
| 9,509,697 B1* | 11/2016 | Salehpour | G06F 21/52 |

(Continued)

FOREIGN PATENT DOCUMENTS

EP 2784716 A1 10/2014
EP 3652639 A1 5/2020
(Continued)

OTHER PUBLICATIONS

"International Search Report" and "Written Opinion of the International Searching Authority," Patent Cooperation Treaty Application No. PCT/US2018/042005, dated Oct. 1, 2018, 7 pages.

(Continued)

*Primary Examiner* — Eleni A Shiferaw
*Assistant Examiner* — Bassam A Noaman
(74) *Attorney, Agent, or Firm* — Carr & Ferrell LLP (57) ABSTRACT

A malicious code detection module identifies potentially malicious instructions in memory of a computing device. The malicious code detection module examines the call stack for each thread running within the operating system of the computing device. Within each call stack, the malicious code detection module identifies the originating module for each stack frame and determines whether the originating module is backed by an image on disk. If an originating module is not backed by an image on disk, the thread containing that originating module is flagged as potentially malicious, execution of the thread optionally is suspended, and an alert is generated for the user or administrator.

20 Claims, 6 Drawing Sheets

(56) References Cited

U.S. PATENT DOCUMENTS

| | | |
|---|---|---|
| 9,690,606 B1 | 6/2017 | Ha et al. |
| 10,045,218 B1 | 8/2018 | Stapleton |
| 10,397,255 B1 | 8/2019 | Bhalotra et al. |
| 2003/0200464 A1 | 10/2003 | Kidron |
| 2004/0199763 A1 | 10/2004 | Freund |
| 2005/0102601 A1 | 5/2005 | Wells |
| 2005/0160313 A1 | 7/2005 | Wu |
| 2006/0026569 A1 | 2/2006 | Oerting et al. |
| 2006/0143707 A1 | 6/2006 | Song et al. |
| 2007/0180509 A1 | 8/2007 | Swartz et al. |
| 2008/0034429 A1 | 2/2008 | Schneider |
| 2008/0052468 A1 | 2/2008 | Speirs et al. |
| 2008/0127292 A1 | 5/2008 | Cooper et al. |
| 2008/0201778 A1 | 8/2008 | Guo |
| 2009/0049550 A1 | 2/2009 | Shevchenko |
| 2009/0077664 A1* | 3/2009 | Hsu ............... G06F 21/566 726/24 |
| 2009/0187396 A1* | 7/2009 | Kinno ............. G06F 21/552 703/22 |
| 2009/0222923 A1* | 9/2009 | Dixon ............. G06F 21/563 726/24 |
| 2010/0100774 A1 | 4/2010 | Ding et al. |
| 2010/0293615 A1 | 11/2010 | Ye |
| 2011/0167434 A1 | 7/2011 | Gaist |
| 2011/0271343 A1 | 11/2011 | Kim et al. |
| 2012/0054299 A1 | 3/2012 | Buck |
| 2012/0159625 A1 | 6/2012 | Jeong |
| 2012/0246204 A1* | 9/2012 | Nalla ............... G06F 12/0253 707/815 |
| 2013/0283030 A1 | 10/2013 | Drew |
| 2013/0332932 A1 | 12/2013 | Teruya et al. |
| 2013/0347111 A1 | 12/2013 | Karta et al. |
| 2014/0032915 A1 | 1/2014 | Muzammil et al. |
| 2014/0137184 A1 | 5/2014 | Russello et al. |
| 2014/0310714 A1* | 10/2014 | Chan ............... G06F 16/285 718/102 |
| 2014/0380477 A1 | 12/2014 | Li |
| 2015/0020198 A1 | 1/2015 | Mirski et al. |
| 2015/0150130 A1 | 10/2015 | Fiala et al. |
| 2015/0264077 A1 | 10/2015 | Berger et al. |
| 2015/0278513 A1 | 10/2015 | Krasin et al. |
| 2015/0295945 A1 | 10/2015 | Canzanese |
| 2015/0339480 A1* | 11/2015 | Lutas ............... G06F 21/56 726/22 |
| 2016/0180089 A1 | 6/2016 | Dalcher |
| 2016/0232347 A1 | 8/2016 | Badishi |
| 2016/0275289 A1* | 9/2016 | Sethumadhavan ... G06F 21/552 |
| 2016/0328560 A1 | 11/2016 | Momot |
| 2016/0357958 A1* | 12/2016 | Guidry ............. G06F 21/53 |
| 2016/0364236 A1 | 12/2016 | Moudgill et al. |
| 2017/0004309 A1 | 1/2017 | Pavlyushchik et al. |
| 2017/0126704 A1* | 5/2017 | Premnath ............. H04L 63/145 |
| 2018/0032728 A1 | 2/2018 | Spisak |
| 2018/0307840 A1 | 10/2018 | David et al. |
| 2019/0018962 A1 | 1/2019 | Desimone |

FOREIGN PATENT DOCUMENTS

| | | |
|---|---|---|
| EP | 3652667 A1 | 5/2020 |
| WO | WO2018026658 A1 | 2/2018 |
| WO | WO2019014529 A1 | 1/2019 |
| WO | WO2019014546 A1 | 1/2019 |

OTHER PUBLICATIONS

"International Search Report" and "Written Opinion of the International Searching Authority," Patent Cooperation Treaty Application No. PCT/US2018/041976, dated Sep. 28, 2018, 5 pages.

"International Search Report" and "Written Opinion of the International Searching Authority," Patent Cooperation Treaty Application No. PCT/US2017/044478, dated Oct. 10, 2017, 7 pages.

Canzanese et al., "System Call-Based Detection of Malicious Processes", 2015 IEEE International Converence on Software Quality, Reliability and Security, Aug. 3-5, 2015, IEEE, 6 pages.

"Extended European Search Report", European Patent Application No. 18831224.3, dated Mar. 29, 2021, 8 pages.

"Extended European Search Report", European Patent Application No. 18832453.7, dated Mar. 18, 2021, 9 pages.

* cited by examiner

SYSTEM AND METHOD FOR DETECTING MALWARE INJECTED INTO MEMORY OF A COMPUTING DEVICE

FIELD OF THE DISCLOSURE

The present disclosure relates to a system and method for detecting the execution of malicious instructions injected into the memory of a computing device.

BACKGROUND

As computing devices become increasingly complex, viruses and malware also are becoming increasingly complex and difficult to detect and prevent. While the prior art includes many approaches for scanning non-volatile storage such as a hard disk drive for such threats, the prior art includes few satisfactory solutions for detecting malicious code loaded into memory or the processor itself.

Figure 1:
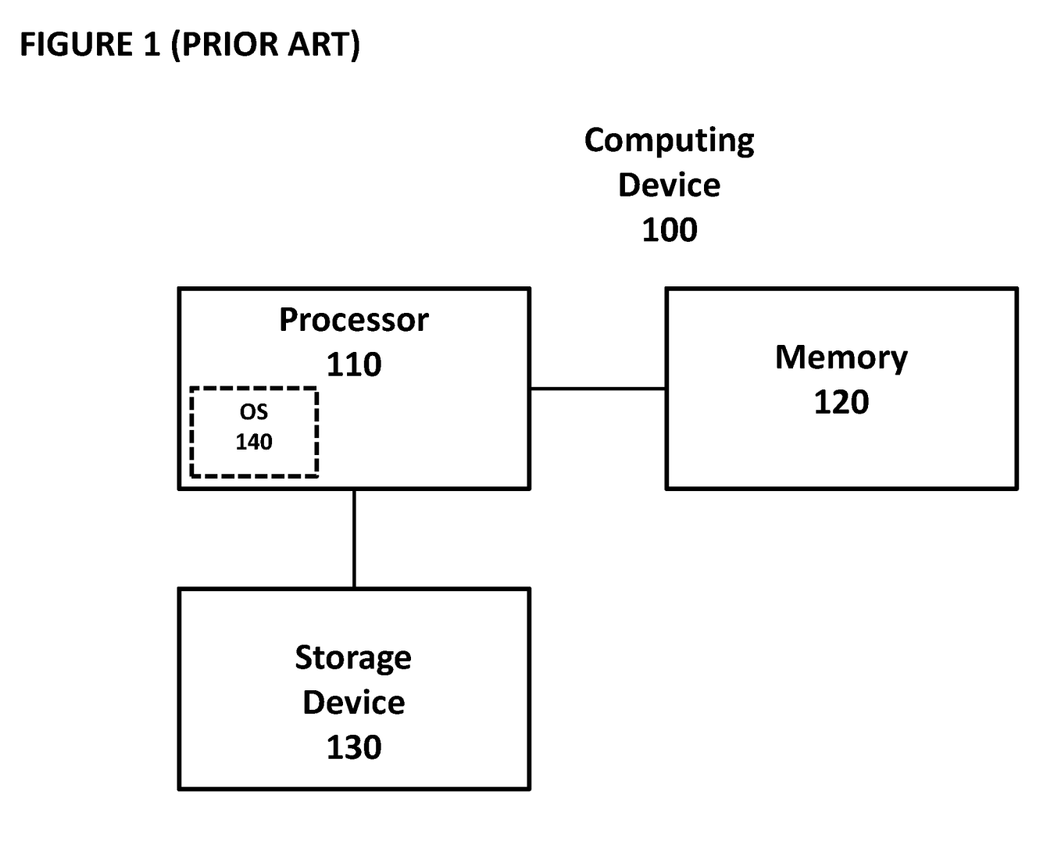
FIG. 1 depicts a prior art computing device.

FIG. 1 depicts an exemplary prior art computing device 100 comprising processor 110, memory 120, and storage device 130. In this example, memory 120 is volatile and can comprise DRAM, SRAM, SDRAM, or other known memory devices. Storage device 130 is non-volatile and can comprise a hard disk drive, solid state drive, flash memory, or other known storage devices. One of ordinary skill in the art will understand that processor 110 can include a single processor core or multiple processor cores as well as numerous cache memories, as is known in the prior art. Processor 110 executes operating system 140. Examples of operating system 140 include the operating systems known by the trademarks WINDOWS® by Microsoft and IOS® by Apple, CHROME OS® and ANDROID® by Google, LINUX and others.

Figure 2:
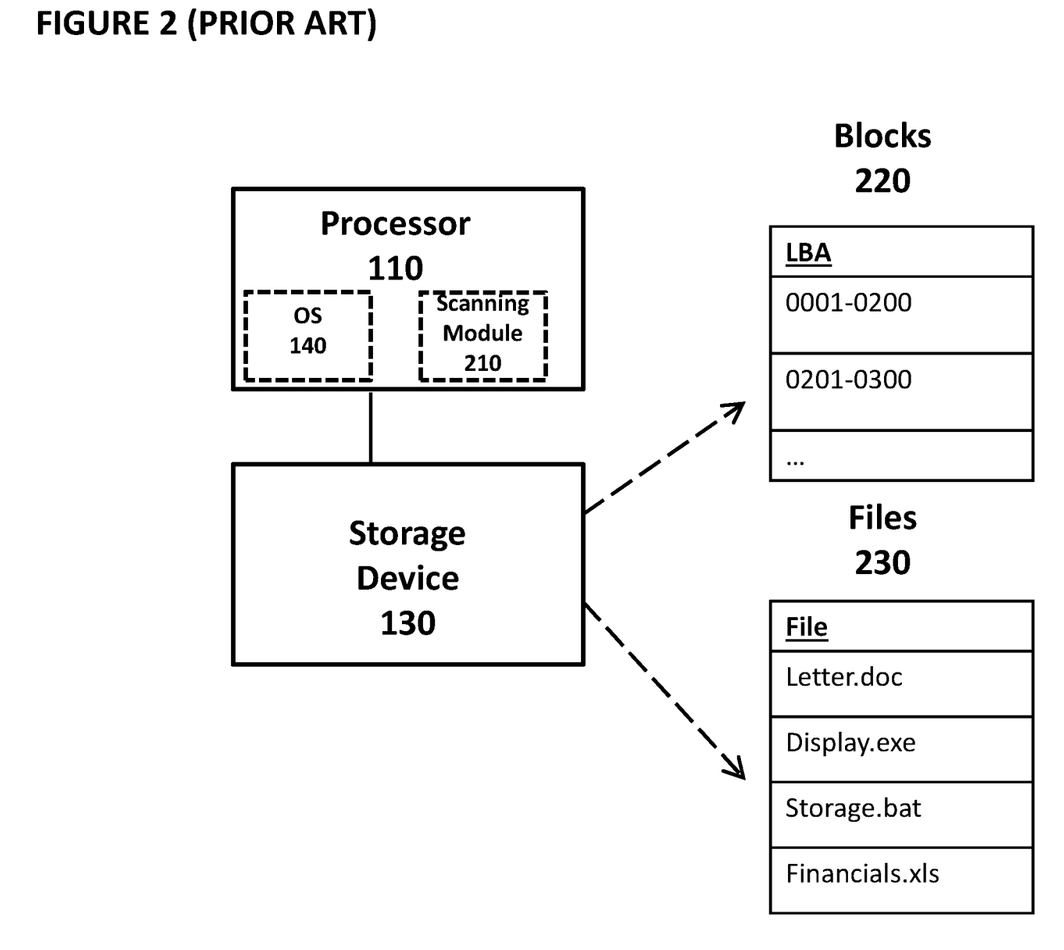
FIG. 2 depicts prior art virus scan software.

In FIG. 2, data is stored in storage device 130. There are numerous mechanisms to store data in storage device 130, and two known mechanisms are shown for illustration purposes. In one mechanism, data is stored as blocks 220 and can be accessed by logical block address (LBA) or similar addressing scheme. In another mechanism, data is stored as files 230 and can be accessed using a file system. In the prior art, scanning module 210 can be executed by processor 110 and can scan either blocks 220 or files 230 to look for malicious code. This often is referred to as virus scan software and is well-suited for identifying and nullifying known malicious programs that are stored in non-volatile devices such as in storage device 130.

While prior art techniques are well-suited for detecting known malicious programs stored in storage device 130, there is no satisfactory technique for detecting malicious instructions that have been injected into memory 120 but not stored in storage device 130.

What is needed is a mechanism for detecting malicious instructions that have been injected into processor 110 or memory 120 but not stored in storage device 130 and generating an alert upon such detection and/or suspending execution of the malicious instructions.

BRIEF SUMMARY OF THE INVENTION

In the embodiments described herein, a malicious code detection module identifies potentially malicious instructions in memory of a computing device. The malicious code detection module examines the call stack for each thread running within the operating system of the computing device. Within each call stack, the malicious code detection module identifies the originating module for each stack frame and determines whether the originating module is backed by an image on disk. If an originating module is not backed by an image on disk, the thread containing that originating module is flagged as potentially malicious, execution of the thread optionally is suspended, and an alert is generated for the user or administrator.

DETAILED DESCRIPTION OF PREFERRED EMBODIMENTS

Figure 3:
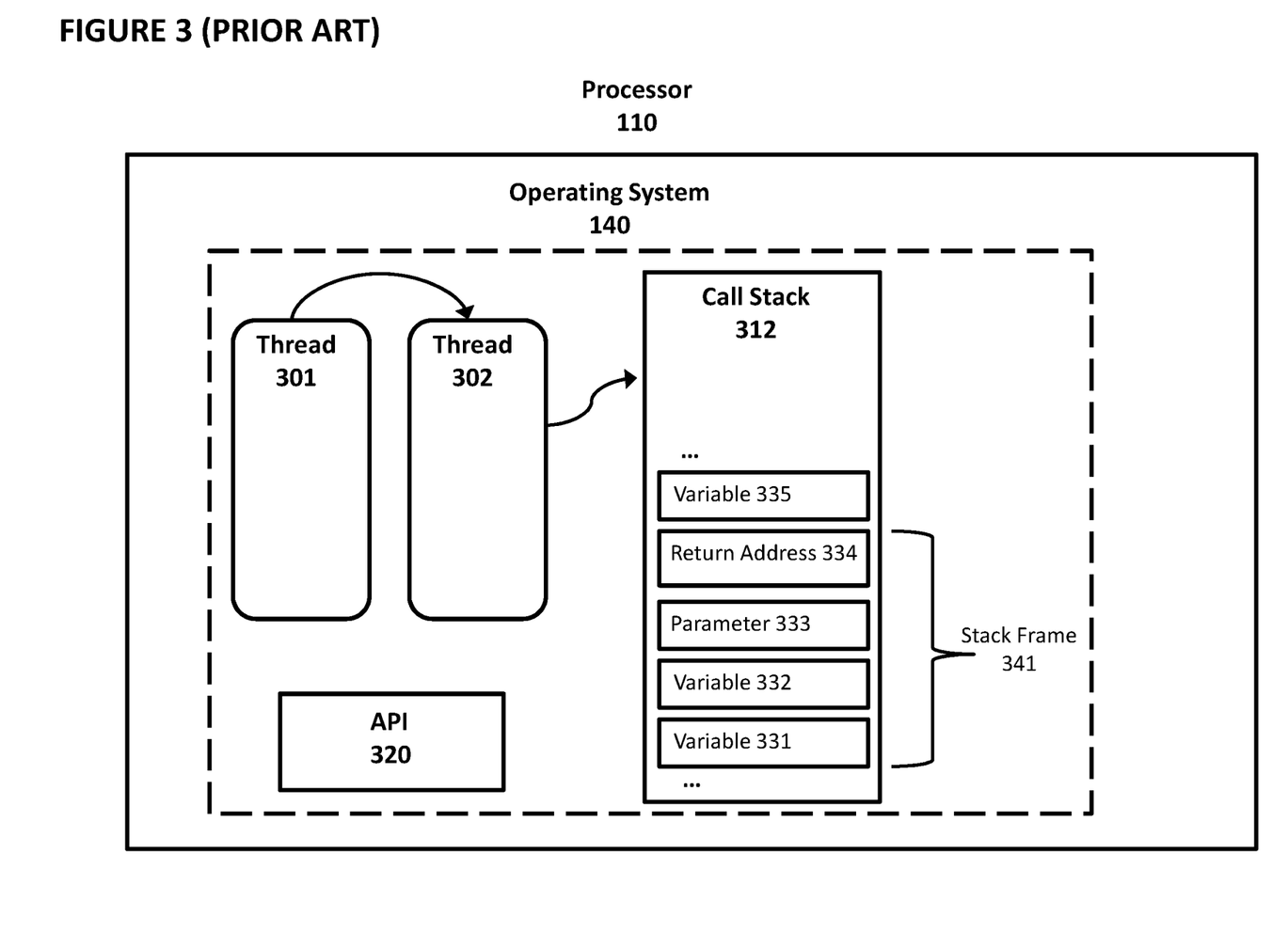
FIG. 3 depicts multiple threads running within a prior art operating system.

Additional aspects of prior art systems will now be described. In FIG. 3, processor 110 executes operating system 140. Operating system 140 can manage multiple threads of instructions that are executed concurrently. Here, exemplary threads 301 and 302 are depicted, but it is to be understood that additional threads can be executed. Operating system 140 maintains a call stack for each thread. Here, exemplary call stack 312 is depicted, which is the call stack for thread 302. Threads can be related to one another. For example, in this example, thread 302 was initiated by thread 301.

In this simplified example, call stack 312 comprises variables 331, 332, and 335 and parameter 333, which were placed in call stack 312 by thread 302. Return address 334 also was placed on call stack 312 by thread 302. Return address 334 is the address corresponding to the instruction in thread 302 that placed stack frame 341 in call stack 312. A stack frame is a collection of data placed in a call stack as part of a procedure. Here, stack frame 341 comprises variables 331 and 332, parameter 333, and return address 334.

Operating system 140 further comprises application programming interface (API) module 320, which is a mechanism by which threads can invoke APIs specific to operating system 140.

Figure 4:
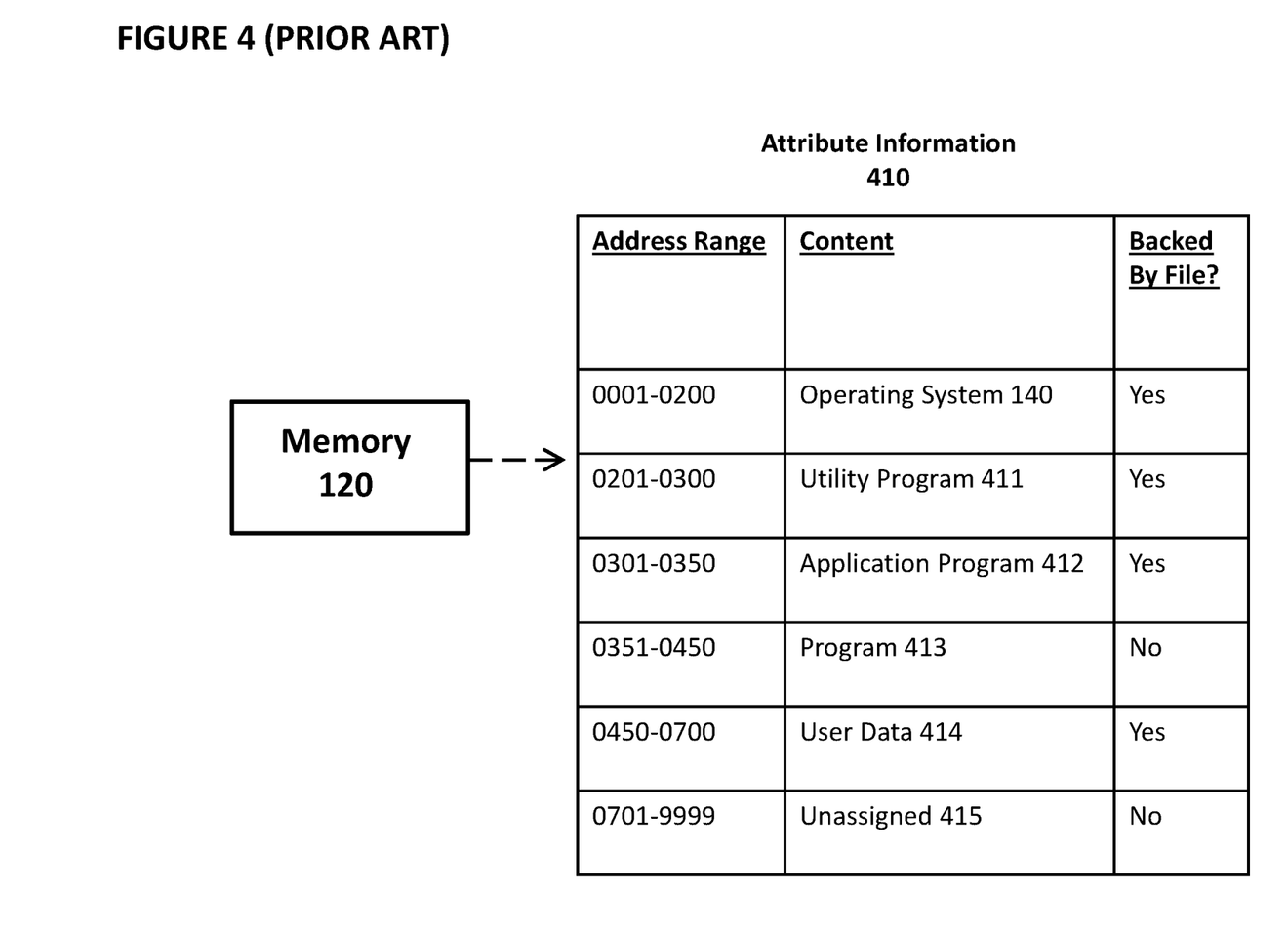
FIG. 4 depicts attribute information for various programs running in a prior art computing device.

FIG. 4 depicts further aspects of the prior art. Here, memory 120 contains various types of programs, user data, and unassigned portions. Each of these items is stored in a particular address range within memory 120, and memory 120 includes attribute information 410 that indicates whether each item is backed by a file stored in storage device 130 (e.g., whether that item is "backed on disk"). In this simple example, attribute information 410 includes address ranges for operating system 140, utility program 411, application program 412, program 413, user data 414, and an unassigned area 415. Attribute information 410 further indicates whether each item is backed by a file in storage device 130 or not. Here, all items are in fact backed by a file except for program 413. Attribute information 410 typically is established and managed by operating system 140.

Figure 5:
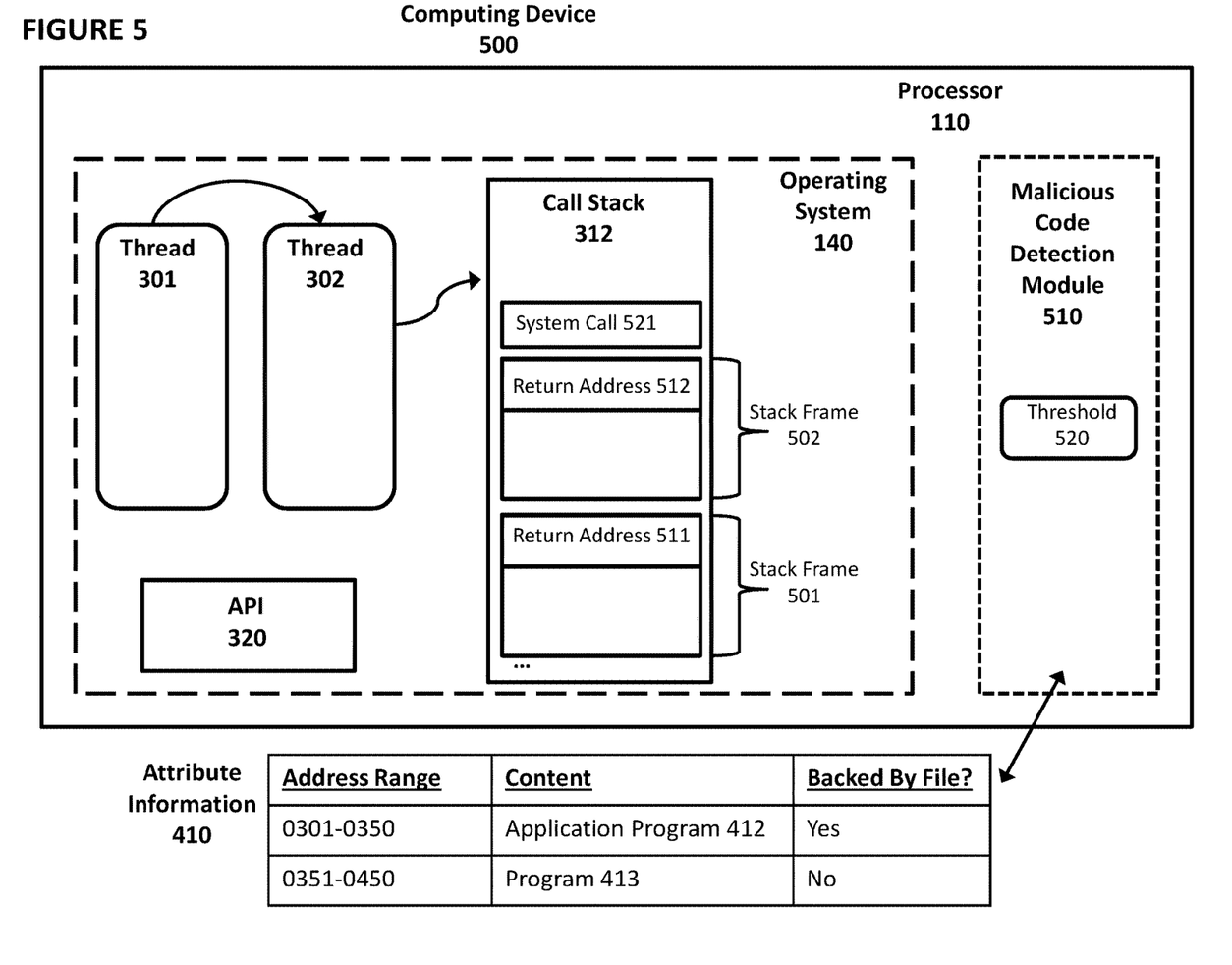
FIG. 5 depicts a malicious code detection module for identifying potentially malicious instructions.

With reference now to FIG. 5, an embodiment of computing device 500 is depicted. Computing device 500 comprises processor 110 and operating system 140 as in the prior art. Computing device 500 further comprises malicious code detection module 510, which comprises lines of code executed by processor 110. Malicious code detection module 510 optionally can be part of the kernel of operating system 140 or can be code outside of operating system 140 that is given special privileges by operating system 140, such as the ability to access attribute information 410 and/or to suspend execution of a thread.

The embodiments detect malicious code based on three characteristics that typically are present in malicious code. First, malicious code usually owns a thread of execution. Second, this thread of execution originates or operates from code that is not backed by a file on disk. Third, the thread of execution must call the operating system API module 320 directly in order for the malicious code to affect appreciable activity on the system. That is, in order for the malicious code to inflict harm, it inevitably must call operating system API module 320 directly. Although there are some exceptions, these three features generally are not found in benign application or operating system 140 itself.

Malicious code detection module 510 first enumerates the call stacks of each thread of execution. In one embodiment, malicious code detection module 510 assigns a unique identifier to each call stack. Once enumerated, each call stack is analyzed to determine if it is malicious in nature.

In the simplified example of FIG. 5, malicious code detection module 510 starts at the top of call stack 312 and works down. The top of a call stack is almost always a system call originating from an operating system library. If not, the thread was likely performing a CPU intensive task and the thread is immediately deemed non-malicious. Here, the top of the call stack 312 is system call 521 (which represents a call made to API module 320), and the analysis therefore continues.

Malicious code detection module continues down call stack 312 and determines the originating module for each stack frame in the reverse order in which the stack frames were added to call stack 312. Here, stack frames 502 and 501 are shown. Malicious code detection module 510 determines the return address for stack frames 502 and 501, which here are return addresses 512 and 511, and determines the procedure within thread 302 associated with the return address. Malicious code detection module 510 then consults attribute information 410 to determine whether the code in which that procedure is contained is backed by a file in storage device 130. If it is (as would be the case if the procedure is part of application program 412), then the procedure and the thread containing it are deemed non-malicious. If it is not (as would be the case if the procedure is part of program 413), then the procedure and the thread containing it are deemed potentially malicious.

Figure 6:
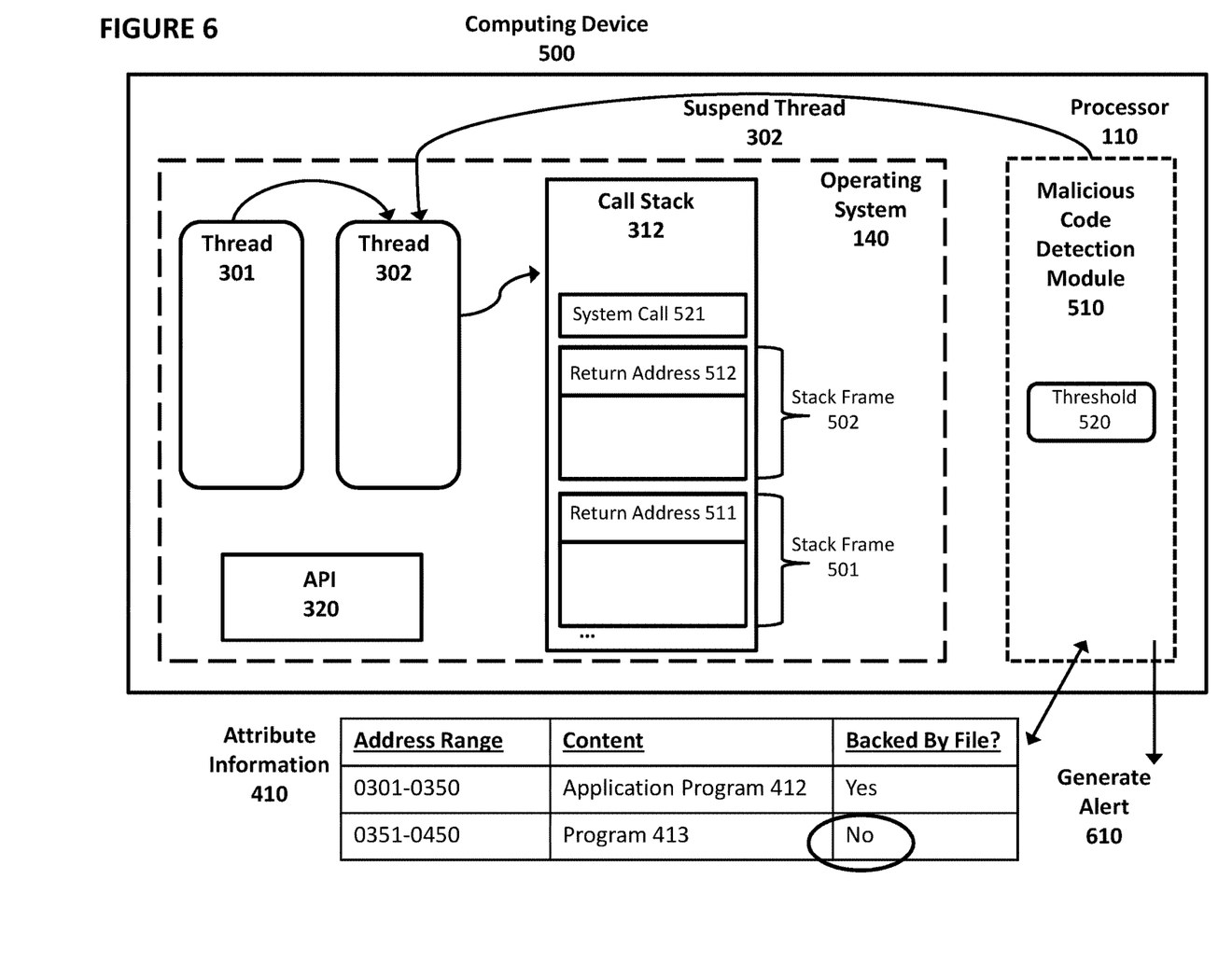
FIG. 6 further depicts a malicious code detection module for identifying potentially malicious instructions.

With reference to FIG. 6, when malicious code detection module 510 determines that a procedure and the thread containing it are potentially malicious, it optionally suspends the thread (if operating system 140 has given malicious code detection module 510 permission to perform such an action) and/or it generates alert 610.

If suspended, thread 302 will not resume execution unless and until a user or administrator expressly instructs computing device 500 to proceed with execution of thread 302.

Alert 610 can take any variety of forms. Alert 610 can be a message displayed on a display operated by a user or administrator. Alert 610 also might be an email, SMS message, MMS message, or other message sent to a device operated by a user or administrator. Alert 610 also might be an audible sound generated by computing device 500.

With reference again to FIG. 5, it is understood that each stack frame is analyzed in the reverse order in which the stack frame was added to the call stack. Optionally, malicious code detection module 510 can stop this analysis when threshold/event 520 is reached. Examples of different threshold/event 520 possibilities include: (1) Malicious code detection module 510 can analyze X stack frames and then stop; (2) Malicious code detection module 510 can analyze the stack frames that were added to call stack 312 within the last Y seconds; (3) Malicious code detection module 510 can analyze the stack frames that were added to call stack 312 since the last analysis performed by malicious code detection module 510 was performed on call stack 312; or (4) Malicious code detection module 510 can analyze the stack frames until it identifies a return address associated with a certain type of procedure. This type of limitation might be desirable because call stacks can become very large, and continuing the analysis indefinitely may slow down processor 110 in performing other tasks.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of detecting malicious code in a computing device comprising a processor executing an operating system and a malicious code detection module, memory, and a non-volatile storage device, the method comprising:
   identifying, by the malicious code detection module, a call stack for a thread of execution within the operating system that includes an originating module and an attribute table;
   assigning, by the malicious code detection module, a unique identifier to the call stack; and
   when a top of the call stack contains a call to an application programing interface of the operating system:
   determining, by the malicious code detection module, the originating module that initiated a stack frame in the call stack,
   wherein the determining step is performed for additional stack frames in the call stack until a threshold or event is reached,
   wherein the threshold or event is based on stack frames, to be analyzed by the malicious code detection module, that were added to the call stack within a specific time period; and
   generating an alert, by the malicious code detection module, when the attribute table associated with the originating module indicates that the originating module is not backed by a file stored in the non-volatile storage device.

2. The method of claim 1, wherein the malicious code detection module is part of a kernel of the operating system.

3. The method of claim 1, wherein the malicious code detection module is not part of the operating system.

4. A method of detecting malicious code in a computing device comprising a processor executing an operating system and a malicious code detection module, memory, and a non-volatile storage device, the method comprising:
  identifying, by the malicious code detection module, a call stack for a thread of execution within the operating system that includes an originating module and an attribute table;
  assigning, by the malicious code detection module, a unique identifier to the call stack; and
  when a top of the call stack contains a call to an application programing interface of the operating system:
  determining, by the malicious code detection module, the originating module that initiated a stack frame in the call stack,
  wherein the determining step is performed for additional stack frames in the call stack until a threshold or event is reached,
  wherein the threshold or event is based on stack frames, to be analyzed by the malicious code detection module, that were added to the call stack within a specific time period; and
  suspending, by the malicious code detection module, the thread of execution containing the originating module when the attribute table associated with the originating module indicates that the originating module is not backed by a file stored in the non-volatile storage device.

5. The method of claim 4, wherein the malicious code detection module is part of a kernel of the operating system.

6. The method of claim 4, wherein the malicious code detection module is not part of the operating system.

7. A computing device comprising: a processor executing an operating system and a malicious code detection module; memory; and a non-volatile storage device;
  wherein the malicious code detection module comprises instructions for: identifying a call stack for a thread of execution that includes an originating module and an attribute table within the operating system;
  assigning, by the malicious code detection module, a unique identifier to the call stack; and
  when a top of the call stack contains a call to an application programing interface of the operating system:
  determining the originating module that initiated a stack frame in the call stack,
  wherein the malicious code detection module further comprises instructions for performing the determining step for additional stack frames in the call stack until a threshold or event is reached,
  wherein the threshold or event is based on stack frames, to be analyzed by the malicious code detection module, that were added to the call stack within a specific time period; and
  generating an alert if the attribute table associated with the originating module indicates that the originating module is not backed by a file stored in the non-volatile storage device.

8. The device of claim 7, wherein the malicious code detection module is part of a kernel of the operating system.

9. The device of claim 7, wherein the malicious code detection module is not part of the operating system.

10. The device of claim 7, wherein the malicious code detection module further comprises instructions for: suspending the thread of execution containing the originating module if the originating module is not backed by a file stored in the non-volatile storage device.

11. A method of detecting malicious code in a computing device, the method comprising:
  identifying, using a processor, a call stack for a thread of execution that includes an originating module and an attribute table within an operating system;
  assigning, by a malicious code detection module, a unique identifier to the call stack; and
  when a top of the call stack contains a system call from an operating system library to an application programing interface of the operating system:
  analyzing, using the processor, the call stack in reverse order in which stack frames were added to the call stack, the analyzing comprising:
  when the call stack does not include a direct call from the thread of execution to the operating system, determining that the thread is non-malicious; and
  when the call stack includes a direct call from the thread of execution to an application programming interface of the operating system:
  determining the originating module that initiated a stack frame in the call stack; and when the attribute table associated with the originating module indicates that the originating module is not backed by a file stored in the non-volatile storage device, determining that the thread is malicious,
  wherein the malicious code detection module further comprises instructions for performing the step of determining the originating module that initiated a stack frame in the call stack, for additional stack frames in the call stack until a threshold or event is reached, and
  wherein the threshold or event is based on stack frames, to be analyzed by the malicious code detection module, that were added to the call stack within a specific time period.

12. The method of claim 11, further comprising, in response to determining that the thread is malicious, generating an alert.

13. The method of claim 12, wherein the malicious code detection module is part of a kernel of the operating system.

14. The method of claim 12, wherein the malicious detection module is not part of the operating system.

15. The method of claim 1, further comprising enumerating the call stack and the additional call stacks.

16. The method of claim 1, further comprising assigning, by the malicious code detection module, a unique identifier to each of the additional call stacks.

17. The method of claim 1, wherein the threshold or event is based on a specified number of stack frames to be analyzed by the malicious code detection module.

18. The method of claim 1, further comprising determining, by the malicious code detection module, a return address for the stack frame.

19. The method of claim 4, further comprising determining, by the malicious code detection module, a return address for the stack frame.

20. The device of claim 7, wherein the malicious code detection module further comprises instructions for determining a return address for the stack frame.

* * * * *